United States Patent [19]

Hodkinson

[11] Patent Number: 4,468,926
[45] Date of Patent: Sep. 4, 1984

[54] VEHICLE BRAKE BOOSTER

[75] Inventor: Harold Hodkinson, Coventry, England

[73] Assignee: Automotive Products plc, Leamington Spa, England

[21] Appl. No.: 369,496

[22] Filed: Apr. 19, 1982

[30] Foreign Application Priority Data

May 1, 1981 [GB] United Kingdom ............... 8113566

[51] Int. Cl.³ .................................... B60T 13/20
[52] U.S. Cl. .................................... 60/550; 60/551
[58] Field of Search ............... 60/548, 550, 551, 555, 60/556, 547.1, 552, 553; 91/460; 137/627.5

[56] References Cited

U.S. PATENT DOCUMENTS 3,968,814  7/1976  Swanson et al. ............ 137/505.18
4,052,996 11/1977  Burrus ........................ 137/627.5
4,218,887  8/1980  Dauvergne ................... 60/551
4,241,582 12/1980  Dauvergne ................... 60/550
4,253,305  3/1981  Dauvergne ................... 60/550
4,305,251 12/1981  Dauvergne ................... 60/551

Primary Examiner—Robert E. Garrett
Assistant Examiner—Randolph A. Smith
Attorney, Agent, or Firm—Kemon & Estabrook

[57] ABSTRACT

A vehicle brake booster comprises a brake master cylinder operable by a brake pedal, and a power valve including valve means operable by the brake pedal to admit fluid under pressure from a source to a boost piston for applying a boost force to the master cylinder and to apply a reaction force to the brake pedal, the valve means are movable against a spring by fluid under pressure from the source from an inactive position to an active position so long as fluid under pressure is available.

6 Claims, 4 Drawing Figures

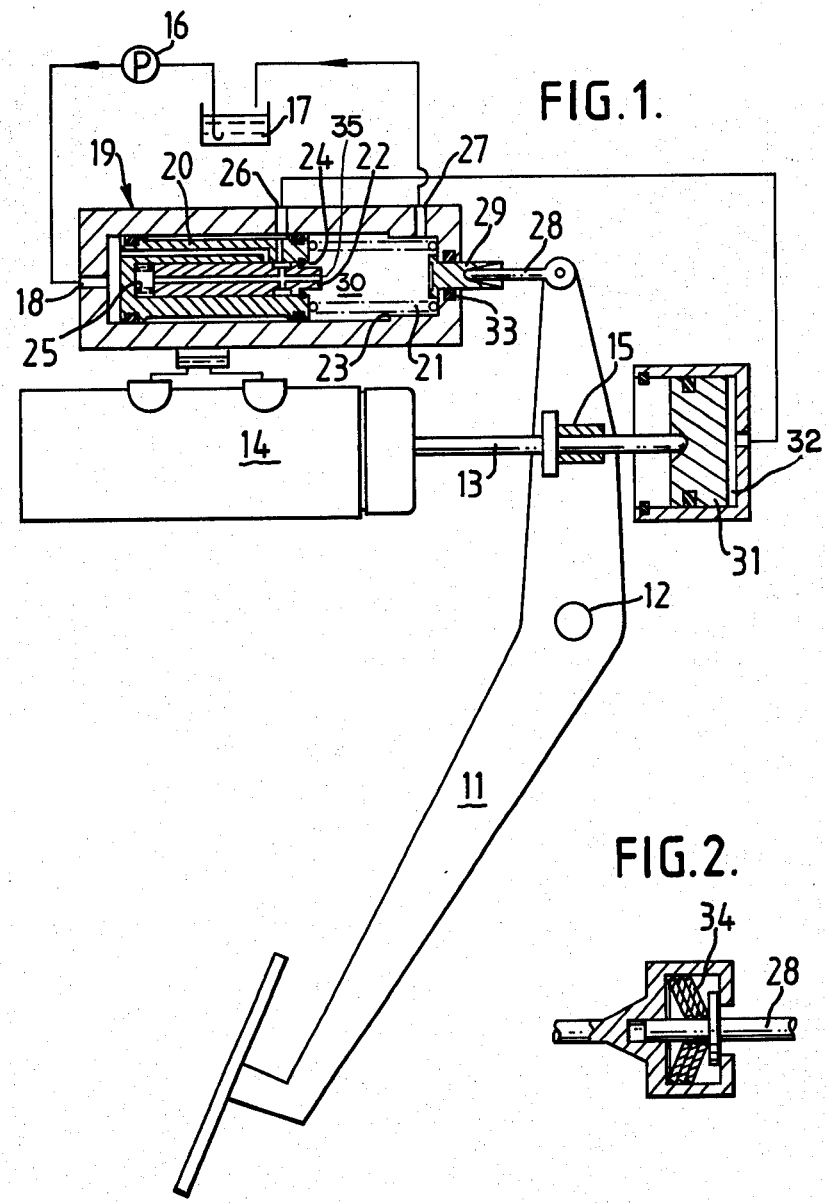

VEHICLE BRAKE BOOSTER

This invention relates to vehicle brake boosters.

Brake boosters augment a drivers braking effort so as to reduce the brake pedal load needed to achieve a given braking effect.

Hitherto the power source for the booster has often been provided by inlet manifold depression of the vehicle engine but it is becoming more common to utilise hydraulic fluid under pressure from, for example, a power steering pump.

Such fluid pressure boosters include a boost piston and a boost valve responsive to a drivers braking effort to admit fluid under pressure to the boost piston to reduce the applied braking effort as a proportion of the braking effect achieved. Feedback means are arranged in the boost valve to apply to the brake pedal a reaction load which is the desired proportion of the braking effect achieved. Usually the boost piston acts on a hydraulic master cylinder in series with the drivers brake pedal.

One problem with previously proposed fluid pressure boosters is that if the fluid pressure source fails, the vehicle driver not only has to apply greater braking effort to achieve a given braking effect but also has to move the now nonworking booster components. The additional loads imposed by, for example, power valve return springs and boost piston hydraulic seals can be considerable.

As a result, because of low efficiency in the failed mode the weight range of vehicles to which the booster may be fitted is not at its optimum.

The present invention provides an improved fluid pressure braking booster which, should the fluid pressure source fail, will result in no substantial extraneous loads on the drivers brake pedal. In other words the braking system loads will be substantially as if the brake booster had never been provided.

According to the present invention there is provided a vehicle braking booster comprising a brake master cylinder operable by a brake pedal, and a power valve including a valve means operable by said brake pedal to admit fluid under pressure from a source to a boost piston applying a boost force to said master cylinder, said valve means also including means to apply to the brake pedal a proportion of the boost force developed by said boost piston, wherein the valve means are movable against a resilient bias by fluid under pressure from the source from an inactive position where no operable contact with the brake pedal is possible to an active position in operable contact with the brake pedal. Preferably the boost piston operably abuts the master cylinder for applying the boost force thereto. Thus non-booster operation of the master cylinder will not move the boost piston and hence impose a drag load on the drivers brake pedal. High efficiency in the failed mode extends the potential weight range of vehicles to which this form of assistance can be applied.

In recent times dual circuit braking systems have become common so that failure of one part of the brake system does not render the complete system inoperative. The present invention is particularly suitable for incorporation in dual circuit braking system. One embodiment of the invention provides a tandem vehicle brake booster comprising two brake master cylinders, each for connection to a respective part of a braking system, and operable by a brake pedal, and a power valve including valve means operable by said brake pedal to admit fluid under pressure from a source to two boost pistons, one for each master cylinder, and for applying a boost force to the respective master cylinder, said valve means also including means to apply to the brake pedal a proportion of the boost force developed by said boost piston, wherein the valve means are movable against a bias by fluid under pressure from the source from an inactive position where no operable contact with the brake pedal is possible to an active position in operable contact with the brake pedal.

Other features of the invention are included in the following description of a preferred embodiment shown, by way of example only, in the following drawings in which:

FIG. 1 is a diagrammatic representation of a brake booster according to one aspect of the invention;

FIG. 2 is a transverse section through a spring box for inclusion in the booster of FIG. 1;

Figure 3:
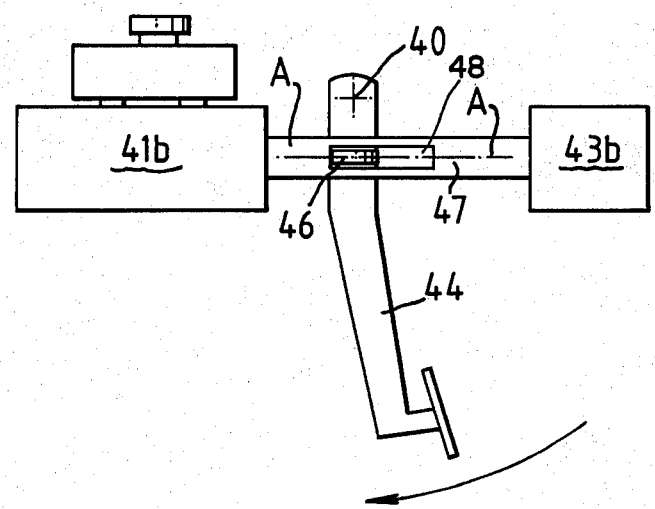
FIG. 3 is a diagrammatic representation of a dual circuit brake booster according to one other aspect of the invention.

With reference to FIG. 1 there is shown a brake pedal 11 having a pivot 12 and which acts on a pushrod 13 of a conventional hydraulic master cylinder 14 through an abutment 15.

A pump 16 supplies hydraulic fluid under pressure from a reservoir 17 to the inlet port 18 of a power valve 19.

The valve 19 includes a body and piston means comprising a piston 20 urged to one end of a bore in the body by a return spring 21. The piston means incorporates valve means comprising a valve member 22 slidable in a closed bore of the piston 20 and which is urged against a circlip 24 at the open end of that bore by a light spring 55. A drain opening 35 at the opposite end of the valve member 22 to spring 25 opens into a spring chamber 30.

When in the active position, to be described, the valve member 22 is movable against the light spring 25 to connect the inlet port 18 to a supply port 26 which is otherwise connected to a drain port 27 in the spring chamber 30 through passages in the piston 20 and valve member 22 and the drain opening 35. A pushrod 28 of the pedal 11 acts on a closure member 29 for the valve member 22.

A boost piston 31 is connected to the supply port 26 and is operable against an extension of the master cylinder pushrod 13. The piston 31 may be kept in contact with the pushrod 13 by a light spring (not shown) housed in the booster chamber 32.

Operation of the brake booster is as follows:

When the pump is running, hydraulic fluid under pressure acts through the inlet port 18 to move the piston 20 to an abutment 23 against the effect on the return spring 21. The piston 20 is now in the active position, a small clearance existing between the valve member 22 and the closure member 29. In this position the supply port 26 is connected to the drain port 27 through the internal passages of the piston 20 and valve member 22 and the drain opening 35, as shown.

Operation of the drivers brake pedal 11 operates the brake master cylinder 14 through the pushrod 13 in the usual manner. The closure member 29 is also moved against the valve member 22 to close the drain opening 35 into the spring chamber 30. Further travel of the closure member urges the valve member 22 against the light spring 25 to connect the inlet port 18 to the supply port 26 and so admit fluid under pressure to the boost chamber 32. The boost piston acts on the master cylinder 14 through the pushrod 13 but without loading the brake pedal 11, due to the arrangement of the abutment 15.

Fluid under pressure also passes to the spring chamber of the light spring 25 where it acts on the end face of the valve member to load the brake pedal 11 through the closure member 29 and pushrod 28. Thus the valve member also constitutes the feedback means which apply to the brake pedal a reaction load proportional to the braking effect achieved.

When the desired degree of braking is achieved relaxation of the brake pedal load will allow the valve member to return under the action of the light spring 25 to close communication between the inlet port 18 and the supply port 26.

Release of the brake pedal will allow the closure member 29 to lift off the valve member 22 to allow communication between the supply port 26 and the drain port 27. The boost piston 31 will be returned by the usual master cylinder return springs.

Should the pump 16 fail the piston 20 will be returned by the spring 21 away from the closure member 29.

Operation of the drivers brake pedal 11 will now actuate the master cylinder in the usual manner, the pushrod 13 lifting off the boost piston 31 and the closure member 29 moving freely in the valve 19. The only extraneous load acting on the brake pedal 11 is from the wiper seal 33 for the closure member 29 and this load would in practice be virtually negligible.

Brake pedal travel in the boosted mode will be limited to that necessary to operate the power valve 19. In order to give the vehicle driver a degree of 'feel' so that increased braking is accompanied by progressive travel of the brake pedal 11 it is desirable to incorporate the spring box of FIG. 2 into the pushrod 28. For boosted operation the belleville spring stack 34 would progressively collapse as the feedback load from the valve member 22 increased, so simulating master cylinder travel. For non-boosted operation the pushrod 28 reacts no feedback load and thus the spring stack 34 is not compressed.

In the non-boosted mode the travel of brake pedal 11 to achieve a given braking effect will be greater than in the boosted mode. This will optimise driver effort as the brake pedal approaches the part of maximum leverage, and also indicates to the driver that power assistance has failed.

Thus it can be seen that should the pump 16 fail, only a very small increase in brake pedal load, as compared with a non-booster application, is evident. The travel of the master cylinder in the boosted mode will be dependent on the characteristic of the spring stack 34, if fitted.

The master cylinder may be of single or tandem design. The position of the pedal pivot point and lever ratios of the master cylinder and power valve 19 may be altered to suit the particular installation requirements.

Figure 4:
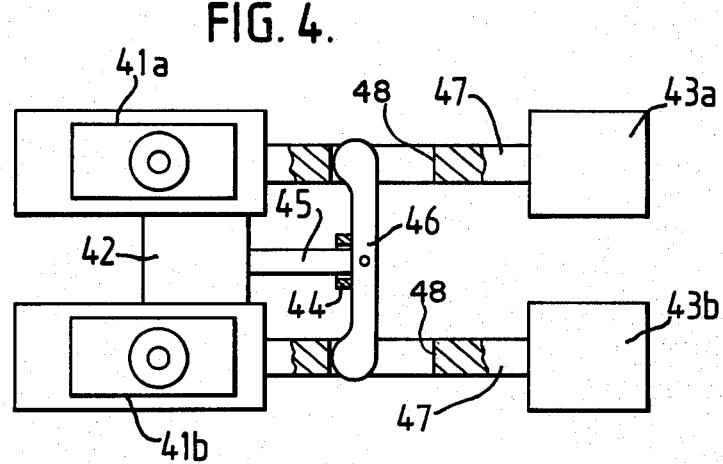
FIG. 4 is an overhead view of the booster of FIG. 3 including a part transverse section through the operating linkage on the line A—A.

With reference to FIGS. 3 and 4 there is shown dual braking system having a brake pedal 44, pivoted at 40, and which acts through a transverse beam 49 or the pushrods 47 of a pair of conventional master cylinders 41a and 41b. A power valve 42 is actuated by the pedal 44 through a pushrod 45 and two boost pistons 43a and 43b are provided, one to act through each pushrod 47.

The transverse beam 46 is housed in a slot 48 of each pushrod 47 so that operation of the boost piston is on the respective master cylinder 41 and not the brake pedal 44. Brake pedal reaction is provided, as previously described, through the pushrod 45.

It is intended that each master cylinder would be connected to part of the vehicle braking system. Failure of one sub-circuit of the brake system will result in unimpeded operation of the remaining master cylinder by the respective boost piston. The feedback load through the pushrod 45 will however remain the same.

Should both sub-systems fail the transverse beam 46 would act on the master cylinders in the usual manner.

If one of the boost pistons 43 fails mechanical actuation of the non-boosted master cylinder would be effected through the transverse beam 46, a slight increase in pedal effort and an increase in pedal travel being felt by the vehicle driver.

As in the previous embodiment failure of the brake booster results in only a small extraneous load being imposed on the brake pedal as compared with a non-boosted application.

I claim:

1. A vehicle brake booster including:
   a brake master cylinder operable by a brake pedal;
   a boost piston for applying a boost force to said master cylinder;
   a fluid pressure source;
   and a power valve comprising:
   a valve body having a bore therein;
   an inlet port in the valve body for connection to said source;
   a supply port in the valve body for connection to said boost piston
   a drain port in the valve body for connection to a reservoir;
   piston means slidable in said bore and urged by a resilient bias to one end of the bore, said piston means being responsive to fluid under pressure at said inlet port to slide to the other end of said bore into operable contact with the brake pedal;
   a closure member slidable in the valve body and connected to the brake pedal and valve means incorporated in said piston means and co-operating with the closure member when said piston means is in an active position adjacent the other end of the bore to admit fluid under pressure from said inlet port to said supply port, the supply port being otherwise connected to the drain port and to apply to the brake pedal a proportion of the boost force developed by said boost piston.

2. A booster according to claim 1, wherein said piston means comprises a piston movable against said resilient bias and said valve means includes a valve member movable in a bore of said piston against resilient means by the closure member, the valve member having a drain opening communicating with the supply port which opening is closable by the closure member.

3. A booster according to claim 2, wherein the resilient bias of said piston is provided by a return spring, a spring chamber in the body houses the return spring and the drain port and drain opening communicate through the spring chamber.

4. A booster according to claim 3, wherein the boost piston operably abuts a pushrod of the master cylinder for applying said boost force thereto.

5. A booster according to claim 4, wherein the brake pedal includes an abutment for operable contact with an abutment of said pushrod, the abutment of the brake pedal also guiding the pushrod.

6. A booster according to claim 5, wherein said pushrod is journalled through the abutment of the brake pedal.

* * * * *